(12) United States Patent
Hilyard et al.

(10) Patent No.: US 8,229,414 B1
(45) Date of Patent: Jul. 24, 2012

(54) RELEASE OF TEMPORARILY ALLOCATED NUMBER TRIGGERED BY VOICE DISCONNECT AT MOBILE SWITCHING CENTER

(75) Inventors: Trey Allen Hilyard, Olathe, KS (US); Sarah A. V. Persson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 425 days.

(21) Appl. No.: 12/511,400

(22) Filed: Jul. 29, 2009

(51) Int. Cl.
*H04M 3/00* (2006.01)

(52) U.S. Cl. ........................................ 455/419; 455/418

(58) Field of Classification Search .......... 455/418–420, 455/432.3, 433
See application file for complete search history.

(56) References Cited

U.S. PATENT DOCUMENTS

| | | | |
|---|---|---|---|
| 6,529,729 B1 * | 3/2003 | Nodoushani et al. | 455/419 |
| 6,546,243 B2 * | 4/2003 | Tiedemann et al. | 455/419 |
| 2005/0009499 A1 * | 1/2005 | Koster | 455/406 |
| 2009/0149175 A1 * | 6/2009 | Lopresti et al. | 455/433 |

* cited by examiner

*Primary Examiner* — George Eng
*Assistant Examiner* — Nam Huynh (57) ABSTRACT

A method of managing a pool of telephone numbers is provided. The method comprises a mobile switching center identifying an incoming voice call as a customer care call based on a dialing code sequence, establishing a memory entry associated with the voice call, and coupling the voice call to an over-the-air service provisioning server. The method further comprises the over-the-air service provisioning server allocating a telephone number from a pool of telephone numbers to the terminal and establishing a communication session with a customer service user interface. The method further comprises the mobile switching center detecting termination of the voice call and transmitting a notification of the termination of the voice call. The method further comprises the over-the-air service provisioning server, in response to the notification of the termination of the voice call, returning the telephone number to the pool of telephone numbers.

14 Claims, 4 Drawing Sheets

RELEASE OF TEMPORARILY ALLOCATED NUMBER TRIGGERED BY VOICE DISCONNECT AT MOBILE SWITCHING CENTER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication has become increasingly widespread in the United States as well as the rest of the world. Mobile communication enables nearly ubiquitous communication coverage in the United States, promoting subscribers to wireless communication services making and receiving voice calls nearly anywhere. Wireless data communication is growing in importance, supported by new wireless communication protocols that promise to provide ubiquitous broadband data communication.

SUMMARY

In an embodiment, a method of managing a pool of telephone numbers is disclosed. The method comprises a mobile switching center identifying an incoming voice call as a customer care call based on a dialing code sequence, establishing a memory entry associated with the voice call, and coupling the voice call to an over-the-air service provisioning server via a circuit switching fabric of the mobile switching center. The method further comprises the over-the-air service provisioning server allocating a telephone number from a pool of telephone numbers to the terminal and establishing a communication session with a customer service user interface. The method further comprises the mobile switching center detecting termination of the voice call and transmitting a notification of the termination of the voice call. The method further comprises the over-the-air service provisioning server, in response to the notification of the termination of the voice call, returning the telephone number to the pool of telephone numbers.

In an embodiment, a mobile switching center (MSC) is disclosed. The mobile switching center comprises a circuit switching fabric, a memory, a processor, and an application. The application, when executed by the processor, receives a voice call originated by a mobile terminal and creates an entry in the memory to manage the voice call, the entry indicating that the voice call is a customer service call based on a dialing code sequence entered by the mobile terminal to originate the voice call. The application further couples the voice call to an over-the-air service provisioning server (OTASP) via the circuit switching fabric, detects a termination of the voice call, and transmits a notification of the termination of the voice call, based on the entry indicating that the voice call is a customer service call and in response to detection of the termination of the voice call.

In another embodiment, a method of telecommunication is disclosed. The method comprises a mobile switching center (MSC) identifying an incoming voice call as a special call class based on a dialing code sequence, the voice call originated by a mobile terminal and the mobile switching center storing a memory entry associated with the voice call comprising information identifying the special call class, identifying the mobile terminal, and identifying the voice call origination time. The method further comprises the mobile switching center coupling the voice call via a circuit switching fabric of the mobile switching center to a special call handling functionality, detecting the termination of the voice call; and, based on the special call class and triggered by detecting the termination of the voice call, transmitting a termination notification message identifying the mobile terminal, the special call class, the origination time, and a termination time associated with termination of the voice call.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

In a complicated call flow that may involve multiple transfers of a call from one communication node to another, for example when activating and/or provisioning a new mobile terminal, resources allocated temporarily for handling the call may not be released when the voice call terminates, for example, because the device or system responsible for allocating the resources does not receive notification of call termination. Where the resources are limited in number, failure to timely release the resources promptly on the event of call termination may lead to an unnecessary exhaustion of the resources and failure to process some calls. In an embodiment, a system and method are provided for improving reliability and consistency in determining when a voice call associated with a special call class is terminated, transmitting a message identifying the termination of the voice call, and releasing, based on the message, the resources allocated temporarily to the voice call. In some contexts, a mobile terminal may be referred to as a wireless terminal. In an embodiment, a mobile switching center (MSC) may store an entry associated with the subject call to activate and/or provision a new mobile terminal. When the new mobile terminal terminates the call, the mobile switching center detects the call termination and, based on the stored entry, sends a notification to an over-the-air service provisioning server. In response to receiving the subject notification, the over-the-air service provisioning server releases the temporarily allocated resources back into a pool for reuse. Because the call continues to be routed via the mobile switching center to provide access to the core network, and notwithstanding a complicated call flow which may result in the call being successively redirected to a variety of different servers, provisioning nodes, and other systems within the core network involved in accomplishing the subject set-up and/or provisioning of the new mobile terminal, the mobile switching center may be able to more reliably and consistently transmit the desired notification to release the temporary resources than any of the many nodes in the core network to which the call may be transiently routed.

Figure 1:
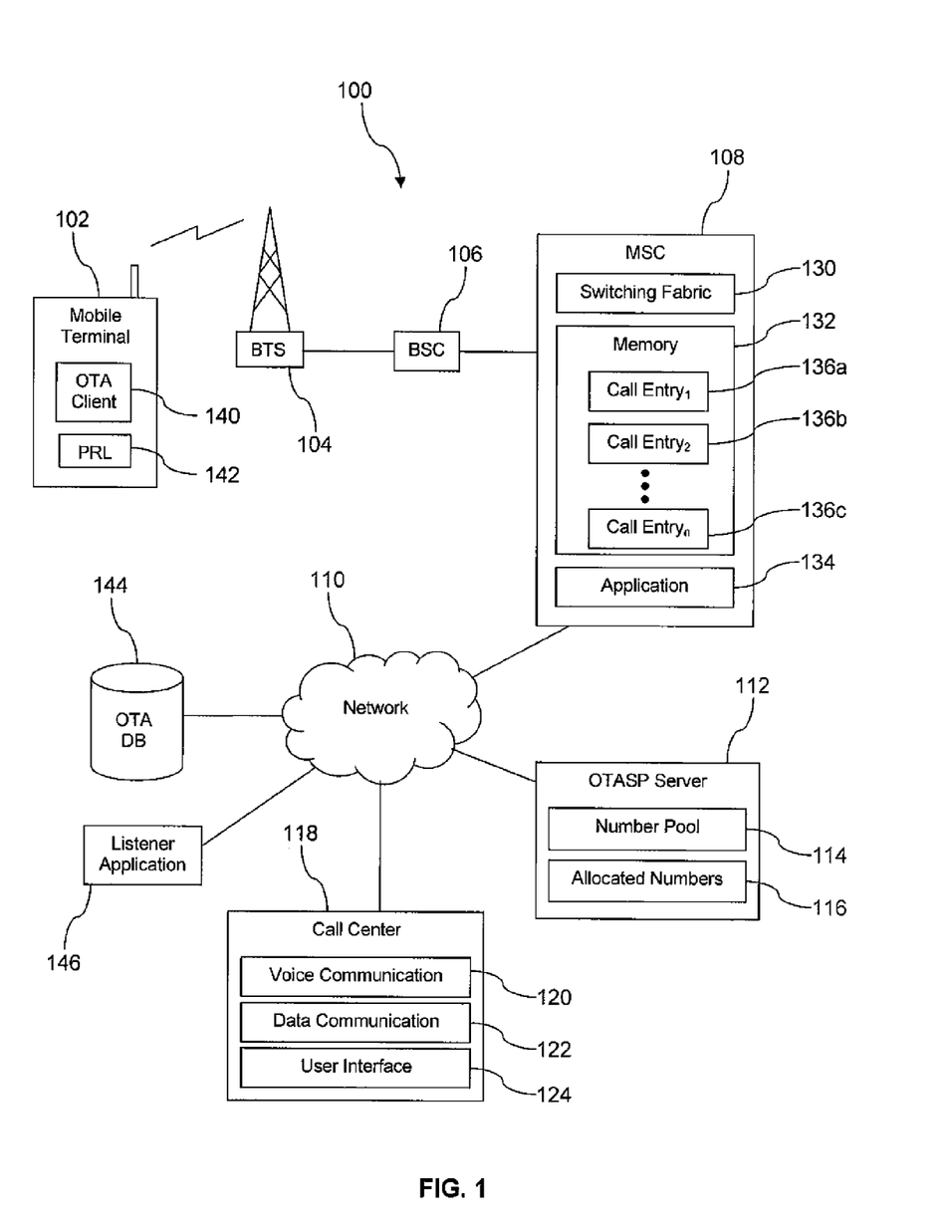
FIG. 1 is an illustration of a communication system according to an embodiment of the disclosure.

Turning now to FIG. 1, a system 100 is described. The system 100 comprises a mobile terminal 102, a base transceiver station (BTS) 104, a base station controller (BSC) 106, a mobile switching center (MSC) 108, a network 110, an over-the-air service provisioning (OTASP) server 112, and a call center 118. While only a single instance of each of these devices is illustrated in FIG. 1, it is understood that the system 100 may comprise any number of mobile terminals 102, base transceiver stations 104, base station controllers 106, mobile switching centers 108, over-the-air service provisioning servers 112, and call centers 118. In an embodiment, the mobile terminal 102 may comprise, without limitation, a mobile phone, a personal digital assistant (PDA), a laptop computer wireless card, and other wireless communication devices. The network 110 may comprise any combination of public and private networks and of circuit switched networks and packet switched networks. In an embodiment, the over-the-air service provisioning server 112 may be implemented as a computer. Computers are discussed in greater detail hereinafter.

The mobile terminal 102 may be in wireless communication with the base transceiver station 104 using any of a variety of wireless communication protocols including, but without limitation, code division multiple access (CDMA), global system for mobile communication (GSM), long-term evolution (LTE), worldwide interoperability for microwave access (WiMAX), and other air interface protocols. The base transceiver station 104 may be in wired and/or wireless communication with the base station controller 106. The base station controller 106 may be in wired and/or wireless communication with the mobile switching center 108. The mobile switching center 108 may be in wired communication with the network 110 and, via the network 110, with the over-the-air service provisioning server 112, the call center 118, and an over-the-air database 144. In some contexts, one or more of the base transceiver station 104, the base station controller 106, and the mobile switching center 108 may be considered to be part of the network 110, but are represented in FIG. 1 as outside the cloud-like abstraction of the network 110 to support describing some of the operational details of these network elements as they pertain to the teachings of the present disclosure.

In one use case of the system 100, the mobile terminal 102 may be a new mobile phone that has not yet been activated. As such, the mobile terminal 102 may not yet be assigned a unique telephone number. In an embodiment, the unactivated mobile terminal 102 may access the network 110 and connect to the call center 118 to conduct activation procedures by dialing a special dialing code sequence, for example, but without limitation, a '*2' dialing code sequence. In an embodiment, inputting a '*2' dialing code sequence into the mobile terminal 102 may cause the mobile terminal 102 to outpulse a '*228xx' digit sequence, where the 'xx' subsequence may be comprise any digit values. In another embodiment, inputting a '*2' dialing code sequence into the mobile terminal 102 may cause the mobile terminal 102 to outpulse a different short code digit sequence. Additionally, user inputs other than '*2' may cause the mobile terminal 102 to outpulse the subject short code digit sequence. The mobile switching center 108 identifies the voice call origination by the mobile terminal 102 to be a special call class and switches the voice call through to the over-the-air service provisioning server 112. To support call processing associated with the activation process, the over-the-air service provisioning server 112 may allocate a telephone number to the mobile terminal 102 and/or the voice call from a number pool 114. The telephone number may be referred to as an allocated number 116. The over-the-air provisioning server 112 may associate a session identification with the voice call from the mobile terminal 102. The over-the-air provisioning server 112 may provide the session identification to the mobile switching center 108. In an embodiment, the number pool 114 may comprise 10,000 temporary telephone numbers. The over-the-air service provisioning server 112 then may transfer the voice call from the mobile terminal 102 to the call center 118.

The call center 118 may comprise a voice communication 120 capability, for example a headset of a customer care representative, a data communication 122 capability for interacting with various databases and/or network nodes in the network 110, and a user interface 124, for example a graphical user interface on a workstation used by the customer care representative. In an embodiment, the voice communication 120 may be provided by a telephone and/or by a call distribution system (CDS). In an embodiment, one or more of the data communication 122 user interface 124 may be provided by a computer. The over-the-air service provisioning server 112 may forward information related to the voice call and/or the mobile terminal 102, for example an electronic serial number (ESN) of the mobile terminal 102, a mobile station identification (MSID) of the mobile terminal 102, a location of the mobile terminal 102, and other information. The information forwarded by the over-the-air service provisioning server 112 may promote more rapid completion of activation of the mobile terminal 102 and/or corroborating information to promote security of the network 110.

The process of activating the mobile terminal 102 may include the over-the-air provisioning server 112 communicating with an over-the-air client 140 of the mobile terminal 102, for example to program a unique telephone number and/or a preferred roaming list (PRL) 142 into the mobile terminal 102. In an embodiment, the preferred roaming list 142 may comprise a database of information used by the mobile terminal 102 for selection of a serving cell during roaming outside of a home area and during other operations. The preferred roaming list 142 may indicate what radio bands, sub-bands, and service provider identifiers will be scanned and in what priority order to select a serving cell.

When the mobile terminal 102 has been activated, the voice call may be terminated, for example by the mobile terminal 102 hanging up. At this point, the over-the-air service provisioning server 112 may return the allocated number 116 back to the number pool 114. In a prior art system, the over-the-air service provisioning server 112 returned the allocated number 116 to the number pool 114 when a disconnect message for the voice call from the mobile terminal 102 was received from the call center, a listener application 146, or other network node in the network 110. To receive the subject disconnect message, the over-the-air service provisioning server 112 may have to filter the subject disconnect message form a larger set of other disconnect messages, only some of which should trigger releasing the allocated number 116 back to the number pool 114. In practice, however, about 20% of voice calls associated with activation procedures terminated without the disconnect message being sent to the over-the-air service provisioning server 112, possibly because of an unanticipated and/or rare sequence of call transfers involved in the specific activation process flow. To handle such special cases, the over-the-air service provisioning server 112 automatically returned the allocated numbers 116 to the number pool 114 after a defined period of inactivity, for example 60 minutes of inactivity. Because an average activation process consumes about 15 minutes, however, this unreliable transmission of disconnect messages may be associated with unnecessary exhaustion of the limited resources of the number pool 114 and degraded activation services provided to new mobile terminals 102.

In an embodiment, the mobile switching center 108 comprises a circuit switching fabric 130, a memory 132, and an application 134. The mobile switching center 108 may share some features in common with a computer system. In other respects, however, the mobile switching center 108 may be highly specialized. For example, as is known to those of ordinary skill in the art, the circuit switching fabric 130 may comprise a combination of specialized hardware and software for circuit switching a first plurality of digital circuits arbitrarily to a second plurality of digital circuits. For example, the circuit switching fabric 130 may promote switching any incoming first digital signal 0 (DS0) arbitrarily, based on the called number, to an outgoing second digital signal 0 (DS0).

In an embodiment, when the mobile terminal 102 originates the voice call using the special dialing code, the application 134 detects the special dialing code, the application 134 commands the circuit switching fabric 130 to connect the voice call appropriately to the over-the-air service provisioning server 112, and the application 134 creates a call entry 136 in the memory 132. The call entry 136 may comprise a variety of information about the voice call, for example the origination time of the voice call, the electronic serial number (ESN) of the mobile terminal 102, the mobile station identification (MSID) of the mobile terminal 102, the special dialing code, and other information. In an embodiment, the over-the-air service provisioning server 112 may transmit a message identifying a session identity for the voice call to the mobile switching center 108, and the application 134 may include the session identity in the call entry 136. In an embodiment, the call entry 136 comprises a context of a mobile switching center call processing thread associated with the voice call. The memory 132 may include a plurality of call entries 136 at one time, for example a first call entry 136a, a second call entry 136b, and an n-th call entry 136c.

When the voice call is terminated, for example the mobile terminal 102 hangs up, the application 134 detects and associates the call termination to the call entry 136 associated with the mobile terminal 102, for example the first call entry 136a. The application 134 analyzes the first call entry 136a and determines that the terminated voice call was a special call class associated with the special dialing code. In an embodiment, based on the special call class of the first call entry 136a, the application 134 may send a disconnect message to the over-the-air service provisioning server 112, for example via a short message delivery point-to-point (SMDPP) disconnect message. Alternatively, in another embodiment, based on the special call class of the first call entry 136a, the application 134 may send a message to the over-the-air database 144 to update an entry associated with the voice call that has terminated. The listener application 146 may scan the over-the-air database 144 periodically, recognize the updated entry, and send a session disconnect message to the over-the-air service provisioning server 112. In an embodiment, the listener application 146 may execute on a computer. In response to receiving the disconnect message, either from the mobile switching center 108 or the listener application 146, the over-the-air service provisioning server 112 returns the temporary phone number to the number pool 114. In an embodiment, the disconnect message may be transmitted by the application 134 via a signal control point (SCP) to the over-the-air service provisioning server 112. In some context, either the disconnect message may be referred to as a notification message and/or a notification.

Figure 2:
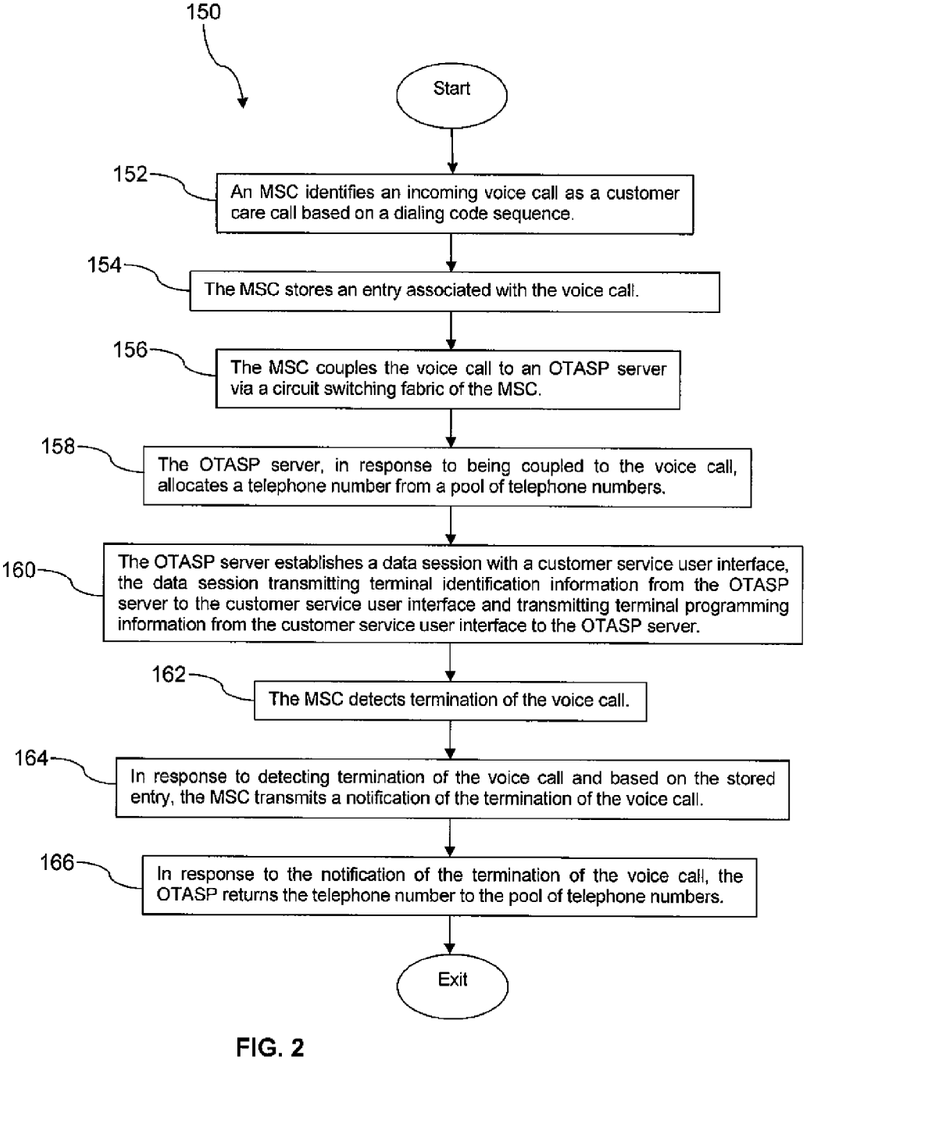
FIG. 2 is a flow chart of a method of managing a pool of telephone numbers according to an embodiment of the disclosure.

Turning now to FIG. 2, a method 150 is described. At block 152, the mobile switching center 108 identifies an incoming voice call, for example a call from the mobile terminal 102, as a customer care call based on a dialing code sequence. In an example without limitation, the dialing code sequence may be a '*2' dialing code sequence. In another embodiment, however, a different type of call may be detected and/or identified by the mobile switching center 108 based on a dialing code sequence and handled by the mobile switching center 108. At block 154, the mobile switching center 108 stores, establishes, allocates, or creates an entry associated with the voice call in the memory 132, for example storing a first call entry 136a in the memory 132. The first call entry 136a may comprise any of a variety of information to both manage the switching of the voice call through the mobile switching center 108 as well as linking the voice call to a customer care call class.

At block 156, the mobile switching center 108 couples the voice call to the over-the-air service provisioning server 112 via the circuit switching fabric 130. At block 158, the over-the-air service provisioning server 112, in response to being coupled to the voice call, allocates a phone number, for example an allocated number 116, from the number pool 114. The allocated number 116 may be associated with the voice call and/or the mobile terminal 102 during the course of the customer care call, for example as the call is transferred to other nodes during the processing of the service request and/or customer care call.

At block 160, the over-the-air service provisioning server 112 establishes a communication session with the user interface 124 associated with the call center 118 and transmits information associated with the customer care call and/or the mobile terminal 102, for example terminal identification information. In an embodiment, the communication session may be passed over the traffic channel to the mobile terminal 102. In some contexts, the communication session may be referred to as an over-the-air service provisioning (OTASP) session. The terminal identification information may comprise an electronic serial number (ESN), a mobile station identity (MSID), or other identification information. The user interface 124 may transmit programming information to the over-the-air service provisioning server 112 via the communication session, for example a unique telephone number and/or a preferred roaming list (PRL). In an embodiment, the communication session may be provided using a variety of communication techniques including, but not limited to, socket connections, message queue communication services, web services, and other communication types. The communication session may involve a combination of different communication techniques and/or communication links and may promote communications among a plurality of different applications.

At block 162, the mobile switching center 108 detects termination of the customer care call from the mobile device 102. For example, the application 134 detects termination of the customer care call. At block 164, based on the call class of the terminated voice call, for example determined by reading the first call entry 136a associated with the voice call, the mobile switching center 108 transmits a notification of the termination of the voice call. The mobile switching center 108 may transmit the notification of the termination according to a variety of formats and to a variety of communication nodes. In an embodiment, the mobile switching center 108 may transmit the notification of the termination of the voice call to either the over-the-air service provisioning server 112 or to the over-the-air database 144. In an embodiment, the mobile switching center 108 may transmit the notification of the termination of the voice call as a short message delivery point-to-point (SMDPP) disconnect message.

At block 166, in response to receiving notification of the termination of the voice call, the over-the-air service provisioning server 112 returns the allocated number 116 associated with the customer service call and/or the mobile terminal 102 to the number pool 114. In an embodiment, the over-the-air service provisioning server 112 may receive the notification from the mobile switching center 108. In another embodiment, however, the over-the-air service provisioning server 112 may receive the notification from the listener application 146. The over-the-air service provisioning server 112 may receive the notification of the termination as a disconnect message.

Figure 3:
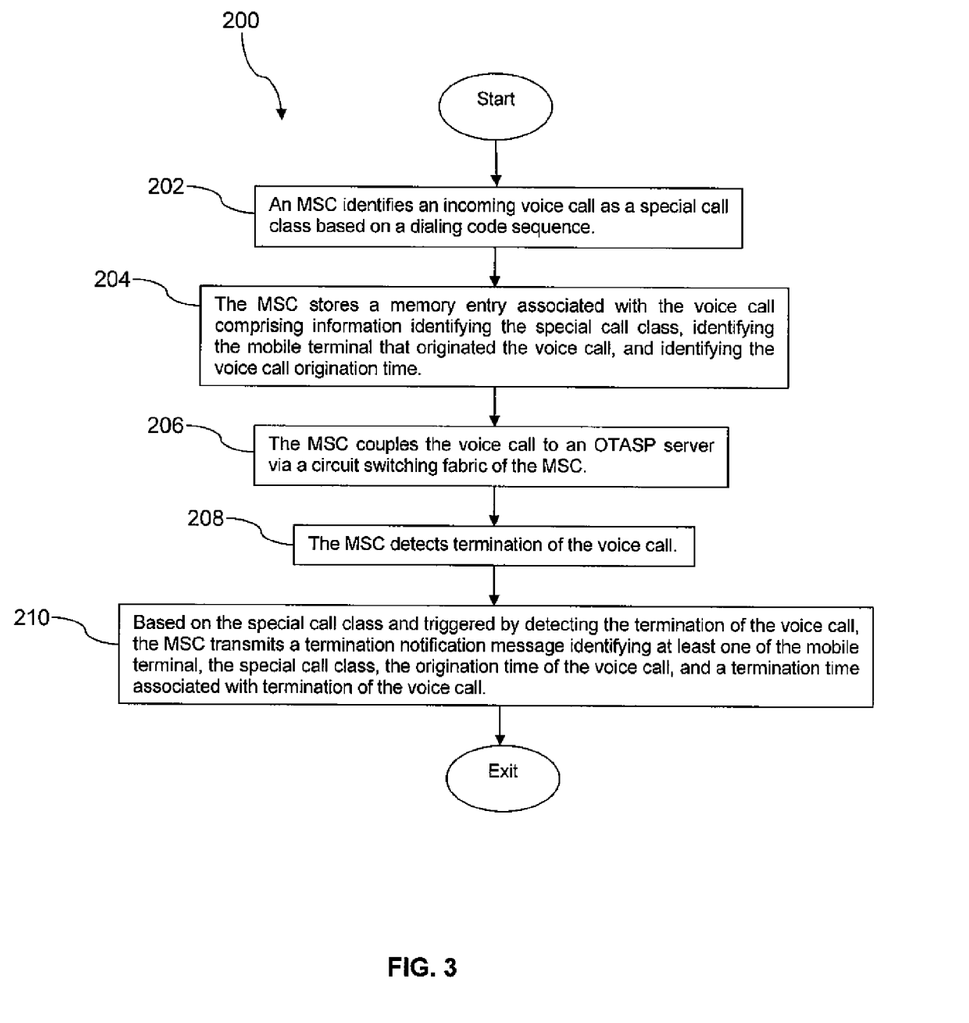
FIG. 3 is a flow chart of a method of telecommunication according to an embodiment of the disclosure.

Turning now to FIG. 3, a method 200 is discussed. At block 202, the mobile switching center 108 identifies an incoming voice call as a special call class based on a dialing code sequence. The mobile switching center 108 may be adapted to detect a plurality of special call classes including an emergency type call, for example a '911' call, a customer care call, for example a '*2' call, and other special call classes.

At block 204, the mobile switching center 108 stores an entry in the memory 132, for example the first call entry 136a, associated with the voice call comprising information identifying the special call class, identifying the mobile terminal, for example the mobile terminal 102, that originated the voice call, and identifying the voice call origination time. The information identifying the mobile terminal 102 may comprise an electronic serial number (ESN), a mobile station identity (MSID), or other identification.

At block 206, the mobile switching center 108 couples the voice call to the over-the-air service provisioning server 112 via the circuit switching fabric 130. At block 208, the mobile switching center 108 detects the termination of the voice call. At block 210, based on the special call class and triggered by detecting the termination of the voice call, the mobile switching center 108 transmits a termination notification message identifying at least one of the mobile terminal 102, the special call class, the origination time of the voice call, and a termination time associated with termination of the voice call.

Figure 4:
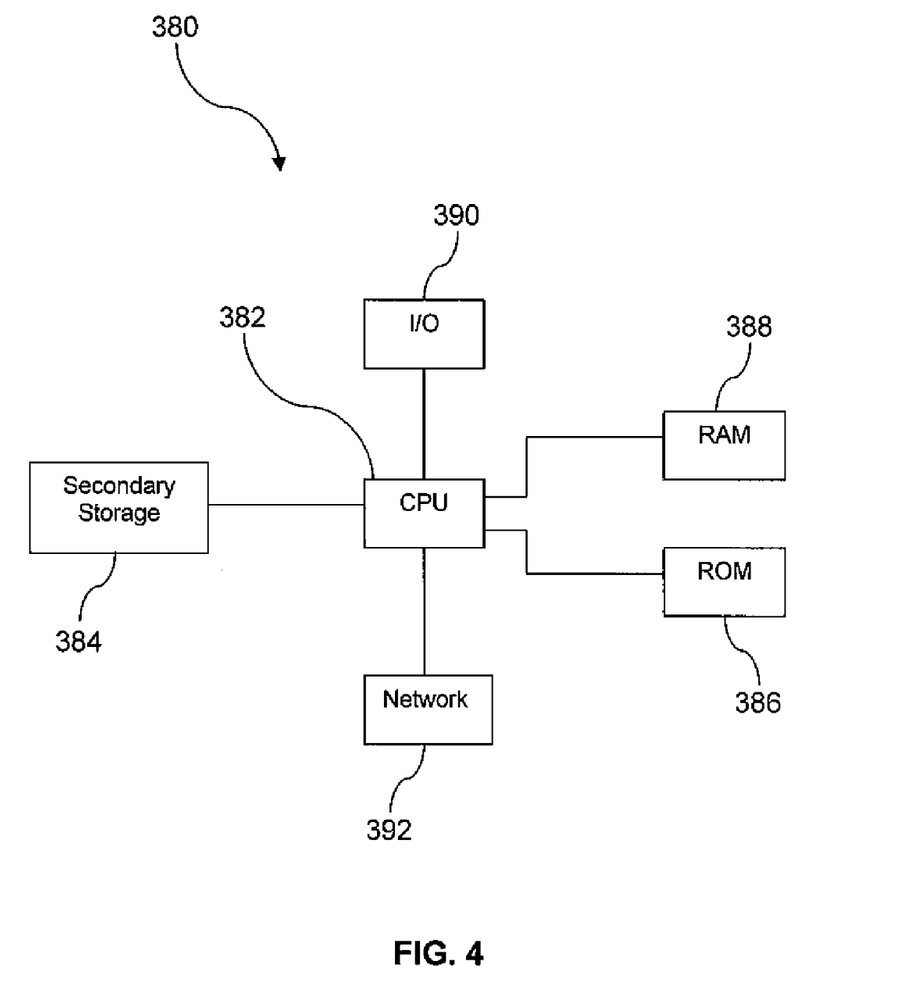
FIG. 4 illustrates an exemplary computer system suitable for implementing some aspects of the several embodiments of the disclosure.

Turning now to FIG. 4, a computer system suitable 380 for implementing one or more aspects of the several embodiments is discussed. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure.

The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of managing a pool of telephone numbers, comprising:
    a mobile switching center (MSC) identifying an incoming voice call as a customer care call based on a dialing code sequence;
    the mobile switching center storing an entry associated with the voice call;
    the mobile switching center coupling the voice call to an over-the-air service provisioning server (OTASP) via a circuit switching fabric of the mobile switching center, the over-the-air service provisioning server adapted for programming a mobile terminal originating the voice call;
    in response to being coupled to the voice call, the over-the-air service provisioning server allocating a telephone number from a pool of telephone numbers to the mobile terminal;
    the over-the-air service provisioning server establishing a communication session with a customer service user interface, the communication session transmitting terminal identification information from the over-the-air service provisioning server to the customer service user interface and transmitting mobile terminal programming information from the customer service user interface to the over-the-air service provisioning server;
    the mobile switching center detecting termination of the voice call;
    in response to detecting the termination of the voice call and based on the stored entry, the mobile switching center transmitting a notification of the termination of the voice call to an over-the-air database, wherein the notification of the termination is different from a call detail record;
    based on receiving the notification of the termination of the voice call, updating a record in the over-the-air database associated with the voice call to set a disconnect flag of the record;
    a listener application transmitting a disconnect message to the over-the-air service provisioning server based on the disconnect flag of the record in the over-the-air database; and
    in response to receiving the disconnect message, the over-the air service provisioning server returning the telephone number to the pool of telephone numbers.

2. The method of claim 1, further comprising in response to detecting the termination of the voice call, the mobile switching center transmitting a call detail record (CDR) associated with the voice call.

3. The method of claim 1, wherein the dialing code sequence comprises '*2'.

4. The method of claim 1, wherein the mobile terminal programming information comprises at least one of a phone number and a preferred roaming list (PRL).

5. The method of claim 1, wherein the mobile terminal identification information comprises one of a mobile station identification (MSID) and an electronic serial number (ESN).

6. The method of claim 1, wherein the pool of telephone numbers comprises numbers having last four digits in the range from 0000 to 9999 and having the same preceding digits.

7. A mobile switching center (MSC), comprising:
    a circuit switching fabric;
    a memory; a processor; and
    an application that, when executed by the processor,
        receives a voice call originated by a mobile terminal,
        creates an entry in the memory to manage the voice call, the entry indicating that the voice call is a customer service call based on a dialing code sequence entered by the mobile terminal to originate the voice call,
        couples the voice call to an over-the-air service provisioning server (OTASP) via the circuit switching fabric, wherein the over-the-air service provisioning server allocates a telephone number from a pool of telephone numbers to the mobile terminal,
        detects a termination of the voice call, and
        transmits a notification of the termination of the voice call to an over-the-air database, based on the entry indicating that the voice call, wherein the notification of the termination is different from a call detail record, wherein a record in the over-the-air database associated with the voice call is updated to set a disconnect flag of the record based on receipt of the notification of the termination of the voice call, wherein a listener application transmits a disconnect message to the over-the-air service provisioning server based on the disconnect flag of the record in the over-the-air database, and wherein the over-the-air service provisioning server returns the telephone number to the pool of telephone numbers in response to receipt of the disconnect message.

8. The mobile switching center of claim 7, wherein the circuit switching fabric couples a first digital signal 0 (DS0) communicatively coupled to the mobile terminal to a second digital signal 0 communicatively coupled to the over-the-air service provisioning server.

9. The mobile switching center of claim 7, wherein the notification is sent in the format of a short message delivery point-to-point (SMDPP) disconnect message.

10. The mobile switching center of claim 7, wherein the application transmits the notification of termination via a signal transfer point (STP).

11. The mobile switching center of claim 7, wherein the notification of termination comprises a session identification associated with the voice call.

12. The mobile switching center of claim 7, wherein the notification of termination comprises information that promotes the over-the-air service provisioning server mapping to a session identification associated with the voice call.

13. The mobile switching center of claim 7, wherein the voice call is associated with an initial activation of the mobile terminal.

14. The mobile switching center of claim 7, wherein the mobile switching center is a component in one of a code division multiple access (CDMA) wireless network, a global system for mobile communications (GSM) wireless network, long-term evolution (LTE), and a worldwide interoperability for microwave access (WiMAX) wireless network.

\* \* \* \* \*